United States Patent
Ivaniuk et al.

(10) Patent No.: US 11,507,573 B2
(45) Date of Patent: Nov. 22, 2022

(54) A/B TESTING OF SERVICE-LEVEL METRICS

(71) Applicant: Microsoft Technology Licensing, LLC, Redmond, WA (US)

(72) Inventors: Alexander Ivaniuk, Sunnyvale, CA (US); Ruirui Xiang, Mountain View, CA (US); Ya Xu, Los Altos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 802 days.

(21) Appl. No.: 16/146,685

(22) Filed: Sep. 28, 2018

(65) Prior Publication Data

US 2020/0104396 A1    Apr. 2, 2020

(51) Int. Cl.
| | |
|---|---|
| *G06F 16/242* | (2019.01) |
| *G06F 9/48* | (2006.01) |
| *G06F 11/07* | (2006.01) |
| *G06Q 30/02* | (2012.01) |
| *G06F 16/951* | (2019.01) |
| *G06F 16/2453* | (2019.01) |
| *G06F 16/2455* | (2019.01) |

(52) U.S. Cl.
CPC ......... *G06F 16/244* (2019.01); *G06F 9/4812* (2013.01); *G06F 11/079* (2013.01); *G06F 16/24545* (2019.01); *G06F 16/24556* (2019.01); *G06F 16/951* (2019.01); *G06Q 30/0201* (2013.01)

(58) Field of Classification Search
CPC ............. G06F 16/244; G06F 16/24545; G06F 16/24556; G06F 16/951; G06F 9/4812; G06F 11/079; G06Q 30/0201
See application file for complete search history.

(56) References Cited

U.S. PATENT DOCUMENTS

| | | |
|---|---|---|
| 8,676,799 B1 | 3/2014 | Vaver |
| 9,032,282 B2 | 5/2015 | Kummer |
| 9,268,663 B1 | 2/2016 | Siddiqui et al. |
| 9,842,092 B1 | 12/2017 | Kim et al. |

(Continued)

OTHER PUBLICATIONS

"PageRank", Retrieved from: http://web.archive.org/web/20180511143556/https://en.wikipedia.org/wiki/PageRank, Retrieved Date: May 11, 2018, 20 Pages.

(Continued)

*Primary Examiner* — Mark D Featherstone
*Assistant Examiner* — Ranjit P Doraiswamy
(74) *Attorney, Agent, or Firm* — NDWE, LLP

(57) ABSTRACT

The disclosed embodiments provide a system for performing A/B testing of service-level metrics. During operation, the system obtains service-level metrics for service calls made during an A/B test, wherein the service-level metrics are aggregated by user identifiers of multiple users. Next, the system matches the service-level metrics to treatment assignments of the users to a treatment group and a control group in the A/B test. The system then applies the A/B test to a first grouping of the service-level metrics for the treatment group and a second grouping of the service-level metrics for the control group. Finally, the system outputs a result of the A/B test for use in assessing an effect of a treatment variant in the A/B test on the service-level metrics.

20 Claims, 4 Drawing Sheets

(56) References Cited

U.S. PATENT DOCUMENTS

| | | |
|---|---|---|
| 10,067,863 B1 | 9/2018 | Gandhi et al. |
| 10,394,796 B1 | 8/2019 | Dang et al. |
| 10,534,851 B1 | 1/2020 | Chan et al. |
| 10,839,406 B2 | 11/2020 | Wang et al. |
| 2008/0189156 A1 | 8/2008 | Voda et al. |
| 2009/0198629 A1 | 8/2009 | De et al. |
| 2009/0282343 A1 | 11/2009 | Catlin et al. |
| 2011/0161825 A1 | 6/2011 | Tierney et al. |
| 2011/0289207 A1 | 11/2011 | Liu et al. |
| 2012/0191691 A1 | 7/2012 | Hansen |
| 2013/0132437 A1 | 5/2013 | Park et al. |
| 2014/0278198 A1 | 9/2014 | Lyon et al. |
| 2015/0106078 A1 | 4/2015 | Chang |
| 2015/0186521 A1 | 7/2015 | Yavilevich |
| 2016/0055261 A1 | 2/2016 | Reinhardt et al. |
| 2016/0077672 A1 | 3/2016 | Anderson et al. |
| 2016/0103758 A1 | 4/2016 | Zhao et al. |
| 2016/0124839 A1 | 5/2016 | Mordo et al. |
| 2016/0170996 A1 | 6/2016 | Frank et al. |
| 2016/0253311 A1* | 9/2016 | Xu .......................... H04W 4/21 715/256 |
| 2016/0253683 A1 | 9/2016 | Gui et al. |
| 2017/0344647 A1 | 11/2017 | Kenthapadi et al. |
| 2018/0129760 A1 | 5/2018 | Kazerouni et al. |
| 2018/0253649 A1 | 9/2018 | Miikkulainen et al. |
| 2018/0349258 A1* | 12/2018 | Kharitonov ......... G06F 11/3692 |
| 2019/0034964 A1 | 1/2019 | Armbrust et al. |
| 2019/0057353 A1 | 2/2019 | Appikatala et al. |
| 2019/0199599 A1* | 6/2019 | Zavesky ................. H04L 41/16 |
| 2019/0236687 A1* | 8/2019 | Tang ................... G06F 16/9038 |
| 2020/0005335 A1 | 1/2020 | Wang et al. |
| 2020/0034882 A1* | 1/2020 | Deng ................. G06Q 30/0244 |
| 2020/0065333 A1 | 2/2020 | Epasto et al. |
| 2020/0104340 A1 | 4/2020 | Liu et al. |
| 2020/0104383 A1 | 4/2020 | Ivaniuk et al. |
| 2020/0104407 A1 | 4/2020 | Saint-jacques et al. |
| 2020/0341883 A1 | 10/2020 | Ditullio et al. |

OTHER PUBLICATIONS

"Non Final Office Action Issued in U.S. Appl. No. 16/022,291", dated Mar. 2, 2020, 38 Pages.

Chopra, Paras, "The Ultimate Guide to A/B Testing", Retrieved from: https://www.smashingmagazine.com/2010/06/the-ultimate-guide-to-a-b-testing/, Jun. 24, 2010, 14 Pages.

"Notice of Allowance Issued in U.S. Appl. No. 16/022,291", dated Sep. 2, 2020, 14 Pages.

Kohavi, et al., "Online Controlled Experiments and A/B Testing", In Book of Encyclopedia of Machine Learning and Data Mining, 2017, 8 Pages.

"Non-Final Office Action Issued in U.S. Appl. No. 16/146,662", dated Dec. 14, 2020, 20 Pages.

"Non Final Office Action Issued in U.S. Appl. No. 16/146,699", dated Apr. 8, 2021, 22 Pages.

"Non Final Office Action Issued in U.S. Appl. No. 16/146,750", dated Sep. 4, 2020, 18 Pages.

"Notice of Allowance Issued in U.S. Appl. No. 16/146,750", dated Mar. 17, 2021, 21 Pages.

Deng, et al., "Trustworthy Analysis of Online A/B Tests: Pitfalls, Challenges and Solutions", In Proceedings of the Tenth ACM International Conference on Web Search and Data Mining, Feb. 6, 2017, pp. 641-649.

Nazir, Atif, "Measuring and Modeling User Activities on Online Social Network-based Applications", Dissertation Submitted in Partial Satisfaction of the Requirements for the Degree of Doctor of Philosophy in Computer Science in the Office of Graduate Studies of the University of California, 2012, 143 Pages.

\* cited by examiner

A/B TESTING OF SERVICE-LEVEL METRICS

BACKGROUND

Field

The disclosed embodiments relate to A/B testing. More specifically, the disclosed embodiments relate to techniques for performing A/B testing of service level metrics.

Related Art

A/B testing, or controlled experimentation, is a standard way to evaluate user engagement or satisfaction with a new service, feature, or product. For example, a company may use an A/B test to show two versions of a web page, email, article, social media post, layout, design, and/or other information or content to users to determine if one version has a higher conversion rate than the other. If results from the A/B test show that a new treatment version performs better than an old control version by a certain amount, the test results may be considered statistically significant, and the new version may be used in subsequent communications or interactions with users already exposed to the treatment version and/or additional users.

A/B tests are typically used to compare user- or product-level metrics between treatment and control versions. For example, an A/B test may be used to determine if a treatment version of a feature increases a view rate, session length, number of sessions, and/or other performance metrisc related to user interaction with the feature. On the other hand, A/B tests may fail to account for the impact of the treatment versions on platforms and/or infrastructure on which the treatment versions are deployed, which may potentially cause performance issues in services that implement or use the treatment versions.

BRIEF DESCRIPTION OF THE FIGURES

In the figures, like reference numerals refer to the same figure elements.

DETAILED DESCRIPTION

Figure 1:
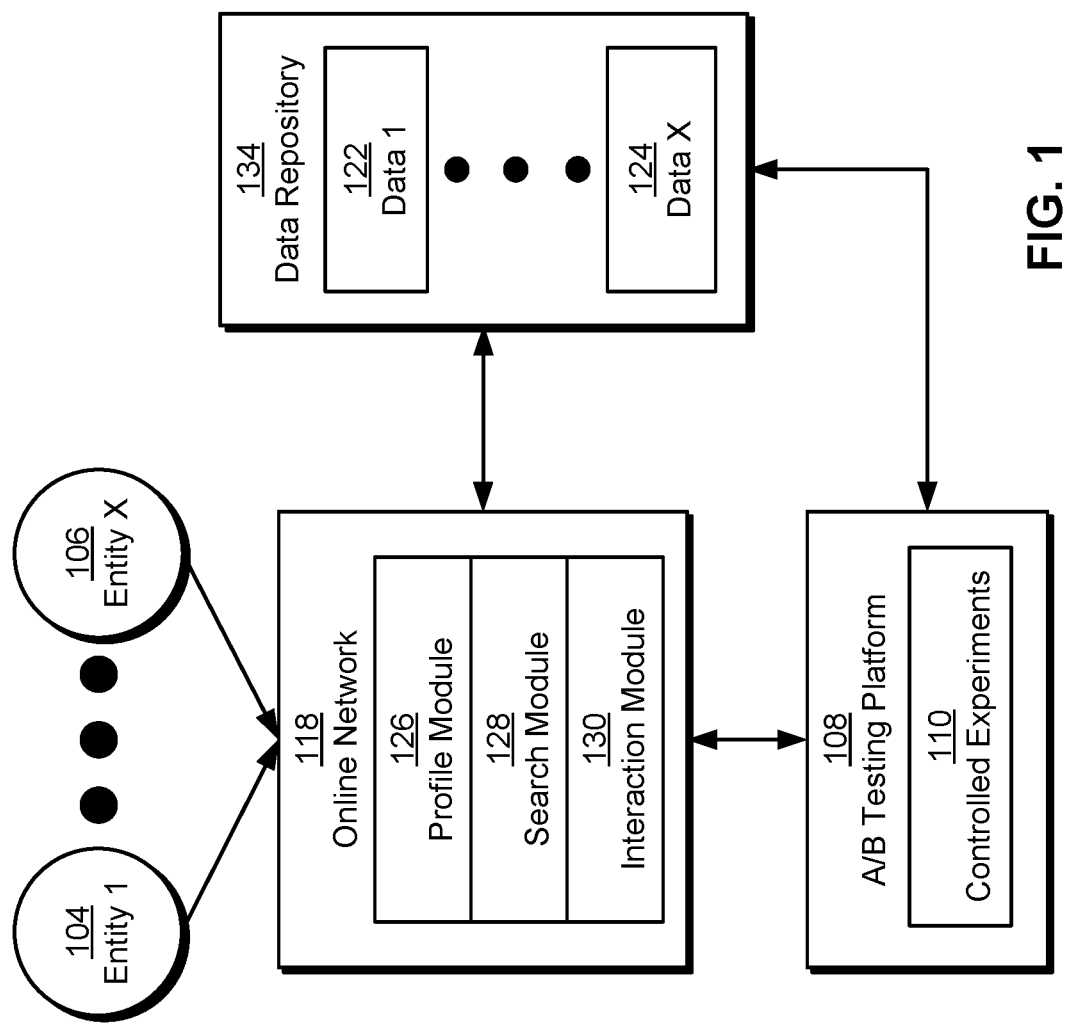
FIG. 1 shows a schematic of a system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The disclosed embodiments provide a method, apparatus, and system for performing A/B testing. During an A/B test, one set of users may be assigned to a treatment group that is exposed to a treatment variant, and another set of users may be assigned to a control group that is exposed to a control variant. The users' responses to the exposed variants may then be monitored and used to determine if the treatment variant performs better than the control variant.

More specifically, the disclosed embodiments provide a method, apparatus, and system for performing A/B testing of service-level metrics. The service-level metrics may track latencies, error rates, inbound requests, outbound requests, and/or other values related to the performance or execution of services in an A/B test. The service-level metrics may be obtained from tracking events for service calls that are made during the A/B test and aggregated by users in the A/B test.

The service-level metrics may then be joined with additional tracking events for the A/B test that contain user identifiers, treatment assignments of the corresponding users to treatment and control groups in the A/B test, and a test key for the A/B test to produce groupings of the service-level metrics by the treatment and control groups. Each grouping may include values, squared values, and/or average values of the service-level metrics that are aggregated by the corresponding treatment assignment.

The A/B test may then be applied to the groupings to assess an effect of the treatment variant in the A/B test on the service-level metrics. For example, the A/B test may be used to determine if a difference in the service-level metrics between the treatment and control variants is statistically significant. The result of the A/B test may further be used to manage subsequent execution of the A/B test. For example, a degradation in performance associated with the treatment variant that is identified by the A/B test may be used to identify a root cause of the degradation and determine whether to continue or discontinue the A/B test.

By collecting, aggregating, and performing A/B testing of service-level metrics for treatment and control variants in A/B tests, the disclosed embodiments may characterize the impact of the treatment variants on services that are called during the A/B tests. In turn, results of the A/B tests may be used to detect and address changes in performance and/or error rates associated with the treatment variants before the A/B tests are continued and/or ramped up. Consequently, the disclosed embodiments may improve the performance of computer systems and/or technologies for performing A/B testing, deploying new versions of services, monitoring service-level metrics, and/or executing services that are affected by A/B testing.

A/B Testing of Service-Level Metrics FIG. 1 shows a schematic of a system in accordance with the disclosed embodiments. As shown in FIG. 1, the system may include an online network 118 and/or other user community. For example, online network 118 may include an online professional network that is used by a set of entities (e.g., entity 1 104, entity x 106) to interact with one another in a professional and/or business context.

The entities may include users that use online network 118 to establish and maintain professional connections, list work and community experience, endorse and/or recommend one another, search and apply for jobs, and/or perform other actions. The entities may also include companies, employers, and/or recruiters that use online network 118 to list jobs, search for potential candidates, provide business-related updates to users, advertise, and/or take other action.

Online network 118 includes a profile module 126 that allows the entities to create and edit profiles containing information related to the entities' professional and/or industry backgrounds, experiences, summaries, job titles, projects, skills, and so on. Profile module 126 may also allow the entities to view the profiles of other entities in online network 118.

Profile module 126 may also include mechanisms for assisting the entities with profile completion. For example, profile module 126 may suggest industries, skills, companies, schools, publications, patents, certifications, and/or other types of attributes to the entities as potential additions to the entities' profiles. The suggestions may be based on predictions of missing fields, such as predicting an entity's industry based on other information in the entity's profile. The suggestions may also be used to correct existing fields, such as correcting the spelling of a company name in the profile. The suggestions may further be used to clarify existing attributes, such as changing the entity's title of "manager" to "engineering manager" based on the entity's work experience.

Online network 118 also includes a search module 128 that allows the entities to search online network 118 for people, companies, jobs, and/or other job- or business-related information. For example, the entities may input one or more keywords into a search bar to find profiles, job postings, job candidates, articles, and/or other information that includes and/or otherwise matches the keyword(s). The entities may additionally use an "Advanced Search" feature in online network 118 to search for profiles, jobs, and/or information by categories such as first name, last name, title, company, school, location, interests, relationship, skills, industry, groups, salary, experience level, etc.

Online network 118 further includes an interaction module 130 that allows the entities to interact with one another on online network 118. For example, interaction module 130 may allow an entity to add other entities as connections, follow other entities, send and receive emails or messages with other entities, join groups, and/or interact with (e.g., create, share, re-share, like, and/or comment on) posts from other entities.

Those skilled in the art will appreciate that online network 118 may include other components and/or modules. For example, online network 118 may include a homepage, landing page, and/or content feed that provides the entities the latest posts, articles, and/or updates from the entities' connections and/or groups. Similarly, online network 118 may include features or mechanisms for recommending connections, job postings, articles, and/or groups to the entities.

In one or more embodiments, data (e.g., data 1 122, data x 124) related to the entities' profiles and activities on online network 118 is aggregated into a data repository 134 for subsequent retrieval and use. For example, each profile update, profile view, connection, follow, post, comment, like, share, search, click, message, interaction with a group, address book interaction, response to a recommendation, purchase, and/or other action performed by an entity in online network 118 may be tracked and stored in a database, data warehouse, cloud storage, and/or other data-storage mechanism providing data repository 134.

In turn, data in data repository 134 may be used by an A/B testing platform 108 to conducted controlled experiments 110 of features in online network 118. Controlled experiments 110 may include A/B tests that expose a subset of the entities to a treatment variant of a message, feature, and/or content. For example, A/B testing platform 108 may select a random percentage of users for exposure to a new treatment variant of an email, social media post, feature, offer, user flow, article, advertisement, layout, design, and/or other content during an A/B test. Other users in online network 118 may be exposed to an older control variant of the content.

During an A/B test, entities affected by the A/B test may be exposed to the treatment or control variant, and the entities' responses to or interactions with the exposed variants may be monitored. For example, entities in the treatment group may be shown the treatment variant of a feature after logging into online network 118, and entities in the control group may be shown the control variant of the feature after logging into online network 118. Responses to the control or treatment versions may be collected as clicks, views, searches, user sessions, conversions, purchases, comments, new connections, likes, shares, and/or other performance metrics representing implicit or explicit feedback from the entities. The metrics may be aggregated into data repository 134 and/or another data-storage mechanism on a real-time or near-real-time basis and used by A/B testing platform 108 to compare the performance of the treatment and control variants.

A/B testing platform 108 may also use the assessed performance of the treatment and control variants to guide ramping up of the A/B test. During such ramping up, exposure to the treatment variant may be gradually increased as long as the collected metrics indicate that the treatment variant is performing well, relative to the control variant. Ramping up may continue until the treatment version is exposed to 100% of users and/or entities in online network 118 and/or the A/B test is discontinued.

Those skilled in the art will appreciate that conventional A/B testing techniques may analyze user- or product-level metrics related to the treatment and control versions. For example, an A/B test may compare the treatment and control versions of a feature, message, and/or content using click-through rates (CTRs), view rates, session length, number of sessions, log-in rates, job application rates, job search rates, and/or other metrics related to user interaction with the treatment and control versions. As a result, conventional A/B tests are typically not configured to detect differences in latency, error rate, inbound and outbound requests, and/or other service-level metrics related to the performance of services used in the A/B tests (e.g., services that expose the users to treatment and control versions of the A/B tests based on treatment assignments of the users to treatment and control groups in the A/B test).

At the same time, monitoring tools for the services may fail to detect changes in the service-level metrics when the A/B tests are ramped to a small proportion of users and/or the changes are relatively small. For example, a treatment variant that causes a 100% increase in a service's error rate over a control variant may only produce a 1% increase in the service's error rate when the corresponding A/B test is ramped up to 1% exposure to the treatment variant. In another example, a 20% increase in outbound requests from a service may fail to be detected by a monitoring tool due to noise and/or cyclical or seasonal fluctuations in the number of outbound requests from the service.

In one or more embodiments, A/B testing platform 108 includes functionality to perform A/B testing of service-level metrics associated with controlled experiments 110, in lieu of or in addition to A/B testing of user- or product-level metrics in the same controlled experiments 110. Such service-level metrics may be collected from services that are called to perform controlled experiments 110.

For example, a request for a ranking of candidates for an opportunity (e.g., job, fellowship, scholarship, mentorship position, leadership position, award, etc.) in online network 118 may be processed by making a series of calls to services that identify candidates for the opportunity, provide features related to the candidates and opportunity, apply machine learning models to the features to produce one or more scores for each candidate-opportunity pair, rank the candidates by the scores, and/or select a subset of the candidates to be returned in response to the request. One or more of the services may use different code blocks, methods, database queries, machine learning models, and/or other components or resources to generate treatment and control variants of the ranking for subsequent comparison in one or more A/B tests. As a result, service-level metrics such as latencies, error rates, inbound request rates, and/or outbound request rates may be collected from the services during the A/B tests to monitor and compare the performance of the services in implementing the treatment and control variants of candidate ranking functionality in online network 118.

Figure 2:
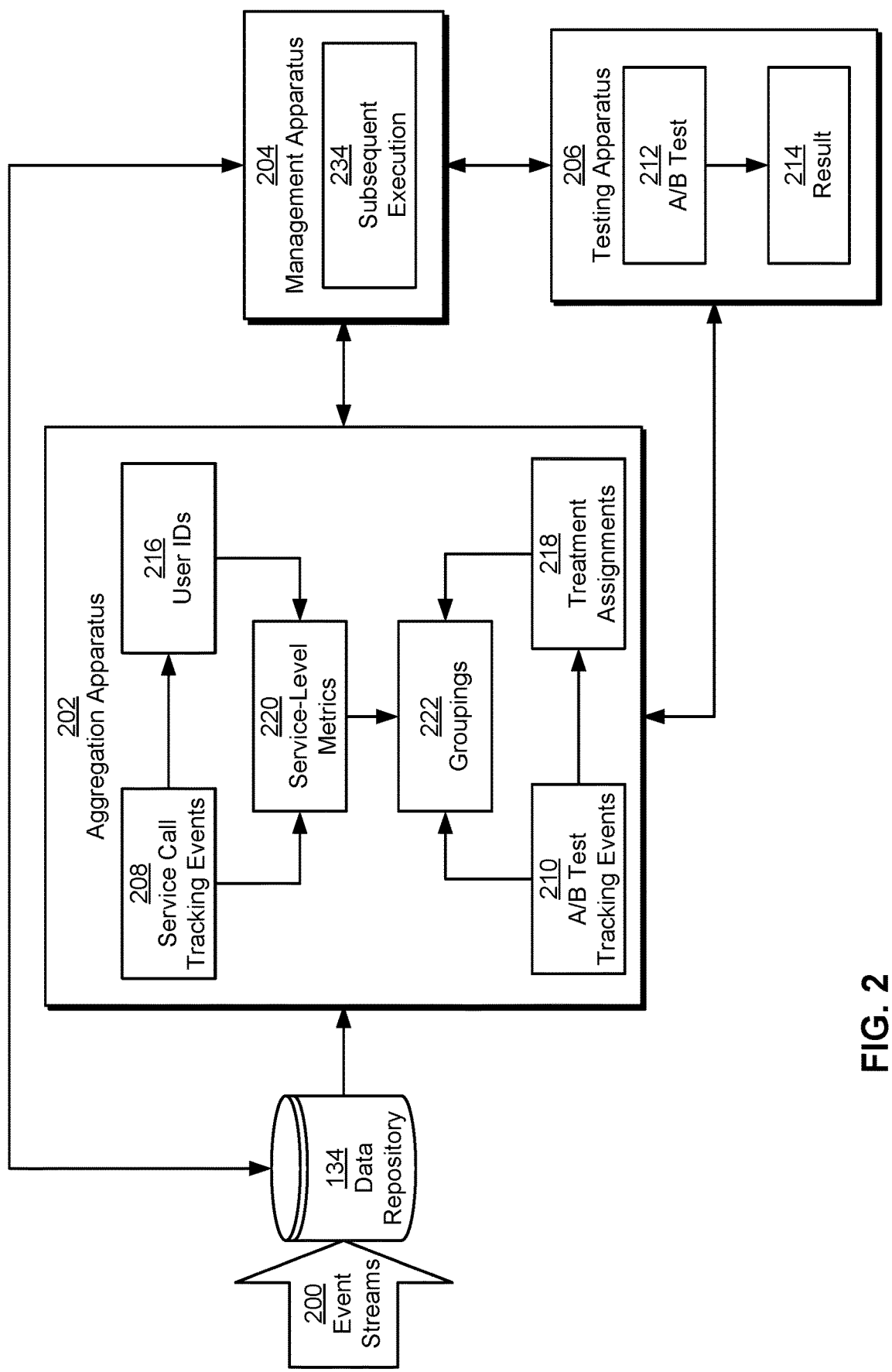
FIG. 2 shows a system for performing A/B testing of service-level metrics in accordance with the disclosed embodiments.

As shown in FIG. 2, a system for performing A/B testing of service-level metrics (e.g., A/B testing platform 108 of FIG. 1) includes an aggregation apparatus 202, a management apparatus 204, and a testing apparatus 206. Each of these components is described in further detail below.

Aggregation apparatus 202 aggregates service-level metrics 220 from tracking events in data repository 134. The tracking events may be generated by computer systems, network nodes, applications, services, and/or other components during processing of requests and/or execution of tasks. For example, each tracking event may represent a record of one or more loads, views, clicks, requests, responses, renders, interactions, and/or other activity on the corresponding component.

In addition, the tracking events may be received over one or more event streams 200. For example, event streams 200 may be generated and/or maintained using a distributed streaming platform such as Apache Kafka (Kafka™ is a registered trademark of the Apache Software Foundation). One or more event streams 200 may also, or instead, be provided by a change data capture (CDC) pipeline that propagates changes to the data from a source of truth for the data. Events in event stream 200 may then be propagated to data repository 134, aggregation apparatus 202, and/or other components subscribing to event streams 200.

More specifically, aggregation apparatus 202 aggregates service-level metrics 220 based on service call tracking events 208 and A/B test tracking events 210 from event streams 200 and/or data repository 134. Service call tracking events 208 may represent calls to services within one or more platforms for which A/B testing is performed. For example, service call tracking events 208 may be used to track a "chain" of calls to services that implement and/or expose users to the treatment and control variants of A/B tests on the platform(s).

Each service call tracking event may include data related to the processing and/or performance of a corresponding service call. For example, a service call tracking event may include a user identifier (ID) for a user associated with the service call, a service ID for the service being called, another service ID for a service performing the call, a "tree ID" that is propagated across a "tree" of service calls during processing of a request for the user, a timestamp of the service call, a latency, and/or an error code (e.g., a HyperText Transfer Protocol (HTTP) error code).

A/B test tracking events 210 may represent activity that is used to conduct an A/B test 212. For example, aggregation apparatus 202 may obtain A/B test tracking events 210 containing treatment assignments of users to the treatment or control groups of A/B test 212. As a result, each A/B test tracking event may include a user ID for a user, a date or timestamp of the event, a test key for A/B test 212 and/or another A/B test, and/or a treatment assignment for the user.

Aggregation apparatus 202 generates service-level metrics 220 from service call tracking events 208 by aggregating fields in service call tracking events 208 by user IDs 216 and/or other attributes. For example, aggregation apparatus 202 may aggregate service call tracking events 208 by user ID and service ID to produce records containing service-level metrics 220 for different combinations of users and services.

An example record containing service-level metrics 220 aggregated from service call tracking events 208 may include the following representation:

```
{
    memberId: 123
    Date: 20160601
    Num_inbound_req: 5
    Num_outbound_req: 8
    Total_latency: 100ms
    Avg_latency: 20ms
    Num_exceptions: 2
    Service_name: Voyager_API
}
```

The above representation includes a numeric "memberId" that uniquely identifies a user, a "Service_name" identifying a service that was called on the user's behalf, and a "Date" representing a day over which service-level metrics 220 are aggregated for the user and service. The representation also includes a "Num_inbound_req" field that specifies the number of incoming requests to the service for the user and a "Num_outbound_req" field that specifies the number of outbound requests from the service for the user. The representation further includes a "Total_latency" field that specifies the total latency of calls to the service for the user and an "Avg_latency" field that specifies the average latency of calls to the service for the user, which is obtained by dividing the total latency by the number of incoming requests. Finally, the representation includes a "Num_exceptions" field that specifies the number of errors encountered during processing of calls to the service for the user.

Next, aggregation apparatus 202 matches service-level metrics 220 to treatment assignments 218 from A/B test tracking events 210 to produce groupings 222 of service-level metrics 220 for the treatment and control groups of A/B test 212. In particular, aggregation apparatus 202 may join records containing service-level metrics 220 that are aggregated by user IDs 216 with fields in A/B test tracking events 210 that also include user IDs 216. Aggregation apparatus 202 may then perform additional aggregation of service-level metrics 220 by treatment assignments 218 in A/B test tracking events 210 to produce two groupings 222 of service-level metrics 220, one for the treatment group and one for the control group.

Generation of groupings 222 from service-level metrics 220 and A/B test tracking events 210 may be illustrated using an example A/B test tracking event with the following representation:

```
{
    memberId: 123
    Date: 20160601
    ExperimentId: XYZ
    Treatment: enabled
}
```

Like the example service call tracking event, the example A/B test tracking event includes a numeric "memberId" that uniquely identifies a user and a "Date" representing a day on which A/B testing activity related to the user (e.g., generation of a treatment assignment for the user) was conducted. The A/B test tracking event also includes an "ExperimentId" field that contains a test key for an A/B test (e.g., A/B test 212) and a "Treatment" field that specifies a treatment assignment for the user. The "Treatment" field is set to a value of "enabled," indicating that the user is assigned to the treatment group of the A/B test.

The example A/B test tracking event may be joined with records of service-level metrics 220 for service calls made during the A/B test, and the joined data may be aggregated by test key and treatment assignment to produce two records containing groupings 222 of service-level metrics 220 for the treatment and control groups. An example record containing a grouping of service-level metrics 220 for the treatment group may include the following representation:

```
{
    Date: 20160601
    ExperimentId: XYZ
    Treatment: enabled
    Total_inbound: 555
    Total_inbound_square: 5555
    Avg_inbound: 5.55
    Total_outbound: 666
    Total_outbound_square: 6666
    Avg_outbound:6.66
    Total_latency: 777
    Total_latency_Square: 7777
    Avg_latency: 7.77
    Total_exceptions: 888
    Total_exceptions_Square: 8888
    Avg_exceptions: 8.88
    Total_unique_members: 100
    Service_name: Voyager_API
}
```

The representation above includes "Date," "ExperimentId," and "Treatment" fields that match those of the example A/B test tracking event and a "Service_name" field that matches that of the example record containing service-level metrics 220 aggregated under a given "memberId." The representation also includes a "Total_unique_members" field that identifies the number of unique users in the treatment group of the A/B test for which service calls to the service were made on the date.

The representation also includes groupings and/or additional aggregations of service-level metrics 220 by the "Date," "ExperimentId," and "Treatment" fields. In particular, the representation includes three different types of aggregation of service-level metrics 220 related to "inbound" requests to the service, "outbound" requests from the service, a "latency" of the service, and "exceptions" (i.e., errors) experienced by the service for the combination of date, A/B test, and treatment assignment. A "Total_X" aggregation for a service-level metric "X" (where "X" can be "inbound," "outbound," "latency," or "exceptions") may include the sum of values of the service-level metric for all members associated with the date, A/B test, and treatment assignment. A "Total_X_Square" aggregation for service-level metric "X" may include the sum of the squares of the values of the service-level metric for all members associated with the date, A/B test, and treatment assignment. An "Avg_X" aggregation for service-level metric "X" may include the average value of the service-level metric for the date, A/B test, and treatment assignment, which may be obtained by dividing the value of "Total_X_Square" by the value of "Total_unique_members."

After groupings 222 of service-level metrics 220 are generated for treatment assignments 218 of A/B test 212 over a given period (e.g., an hour, a day, etc.), testing apparatus 206 performs A/B test 212 using groupings 222. For example, testing apparatus 206 may use A/B test 212 to compare values of service-level metrics 220 from one grouping for the treatment group with values of service-level metrics from another grouping for the control group.

In turn, testing apparatus 206 may generate and/or output a result 214 of A/B test 212 that characterizes the effect of the treatment variant on service-level metrics 220. For example, testing apparatus 206 may include, in result 214, a percentage difference in each service-level metric between the treatment and control groups, along with a statistical significance and/or confidence interval associated with the difference. Testing apparatus 206 may output result 214 in a user interface, application-programming interface (API), notification, message, email, file, spreadsheet, database record, and/or other format.

Finally, management apparatus 204 manages subsequent execution 234 of A/B test 212 based on result 214. For example, management apparatus 204 may use data in service call tracking events 208, A/B test tracking events 210, and/or other tracking events obtained from event streams 200 and/or data repository 134 to identify a root cause of a statistically significant difference in service-level metrics 220 between the treatment and control groups and/or an increase in the number of service-level metrics 220 with a statistically significant difference between the treatment and control groups.

Management apparatus 204 may then generate output to continue or discontinue A/B test 212 based on the root cause. Continuing with the example, management apparatus 204 may discontinue A/B test 212 if the root cause is deemed to be abnormal (e.g., a bug in the treatment version is causing a service to experience a higher error rate). In turn, an owner of A/B test 212 may address the root cause while A/B test 212 is suspended (e.g., by fixing the bug) before resuming A/B test 212 (e.g., to continue collecting and comparing user-level, product-level, and/or service-level metrics 220 related to the treatment and control variants). Conversely, management apparatus 204 may continue A/B test 212 if the root cause is deemed to be normal (e.g., if the treatment version involves an additional database query and/or service call that is deemed to have normal performance).

In another example, management apparatus 204 may ramp A/B test 212 up or down based on result 214. For example, management apparatus 204 may continue ramping up exposure to the treatment variant as long as service-level metrics 220 and/or other types of performance metrics (e.g., CTRs, page views, user sessions, etc.) for the treatment variant are not significantly worse than the corresponding metrics for the control variant. On the other hand, management apparatus 204 may stop ramping up of A/B test 212 and/or ramp down exposure to the treatment variant if metrics for the treatment variant are significantly worse than the corresponding metrics for the control variant.

By collecting, aggregating, and performing A/B testing of service-level metrics for treatment and control variants in A/B tests, the system of FIG. 2 may characterize the impact of the treatment variants on services that are called during the A/B tests. In turn, results of the A/B tests may be used to detect and address changes in performance and/or error rates associated with the treatment variants before the A/B tests are continued and/or ramped up. Consequently, the disclosed embodiments may improve the performance of computer systems and/or technologies for performing A/B testing, deploying new versions of services, monitoring service-level metrics, and/or executing services that are affected by A/B testing.

Those skilled in the art will appreciate that the system of FIG. 2 may be implemented in a variety of ways. First, aggregation apparatus 202, management apparatus 204, testing apparatus 206, and/or data repository 134 may be provided by a single physical machine, multiple computer systems, one or more virtual machines, a grid, one or more databases, one or more filesystems, and/or a cloud computing system. Aggregation apparatus 202, management apparatus 204, and/or testing apparatus 206 may additionally be implemented together and/or separately by one or more hardware and/or software components and/or layers.

Second, the functionality of the system may be adapted to various types of online controlled experiments and/or hypothesis tests. For example, the system of FIG. 2 may be used to monitor and compare service-level metrics for different features and/or versions of websites, social networks, applications, platforms, advertisements, recommendations, and/or other hardware or software components that impact user experiences. In another example, the system of FIG. 2 may be used to monitor other types of service-level metrics, such as page load times, processor utilization, memory consumption, idle times, disk activity, temperature, voltage, currents, and/or vibrations.

Figure 3:
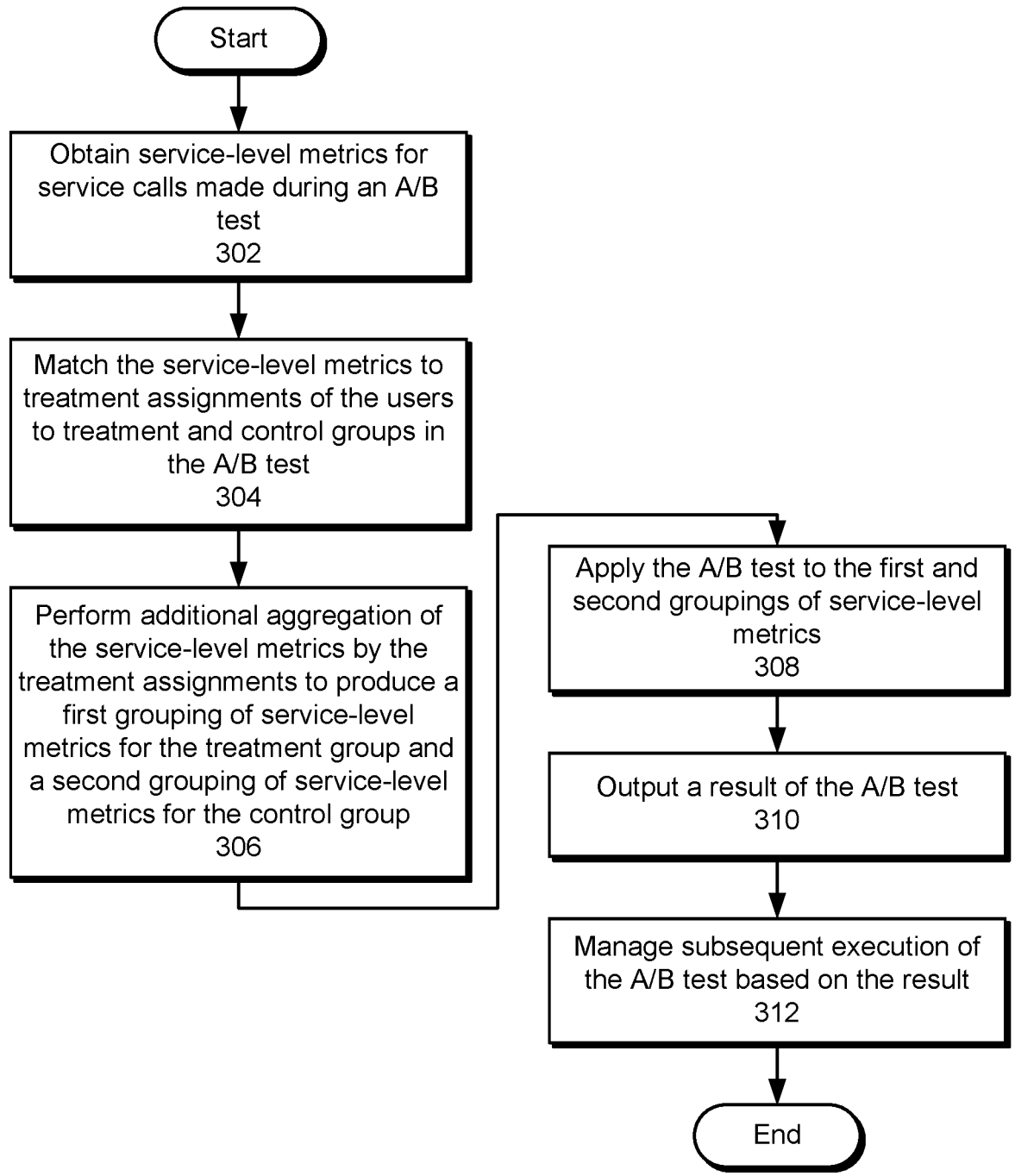
FIG. 3 shows a flowchart illustrating a process of performing A/B testing of service-level metrics in accordance with the disclosed embodiments.

FIG. 3 shows a flowchart illustrating a process of performing A/B testing of service-level metrics in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, service-level metrics for service calls made during an A/B test are obtained (operation 302). For example, tracking events for the service calls may be obtained from one or more event streams on a nearline basis, and service-level metrics in the tracking events may be aggregated by user IDs for users in the tracking events. In turn, the service-level metrics may include a latency (e.g., total latency, average latency, etc.), an error count, a number of inbound requests to a service, and/or a number of outbound requests from the service for each user over a given period (e.g., an hour, a day, etc.).

Next, the service-level metrics are matched to treatment assignments of the users to treatment and control groups in the A/B test (operation 304). For example, the service-level metrics may be joined with a test key for the A/B test and the treatment assignments in additional tracking events for the A/B test based on join keys that include user IDs for the users and/or service identifiers for one or more services.

Additional aggregation of the service-level metrics by the treatment assignments is performed to produce a first grouping of service-level metrics for the treatment group and a second grouping of service-level metrics for the control group (operation 306). For example, different sets of service-level metrics for a large number of users in the A/B test may be aggregated into a single grouping of service-level metrics for the treatment group and another grouping of service-level metrics for the control group. Each grouping of service-level metrics may include a value of a service-level metric (e.g., an overall latency for each user) that is summed for all users in the corresponding treatment assignment over a period, a squared value of the service-level metric (e.g., a square of the overall latency for each user) that is summed for the same users over the same period, and/or an average value of the service-level metric that is obtained by dividing the value of the service-level metric by the number of users in the treatment assignment.

The A/B test is then applied to the first and second groupings of service-level metrics (operation 308), and a result of the A/B test is outputted (operation 310). For example, the A/B test may be used to determine if a difference in service-level metrics between the treatment and control groups is statistically significant. The result of the A/B test may include a percentage difference in each service-level metric between the two groups, a confidence interval associated with the difference, and/or a statistical significance associated with the difference.

Finally, subsequent execution of the A/B test is managed based on the result (operation 312). For example, a root cause of a statistically significant difference in the service-level metrics between the treatment group and the control group may be identified, and output to continue, discontinue, ramp up, ramp down, and/or otherwise modify the execution of the A/B test may be generated based on the root cause.

Figure 4:
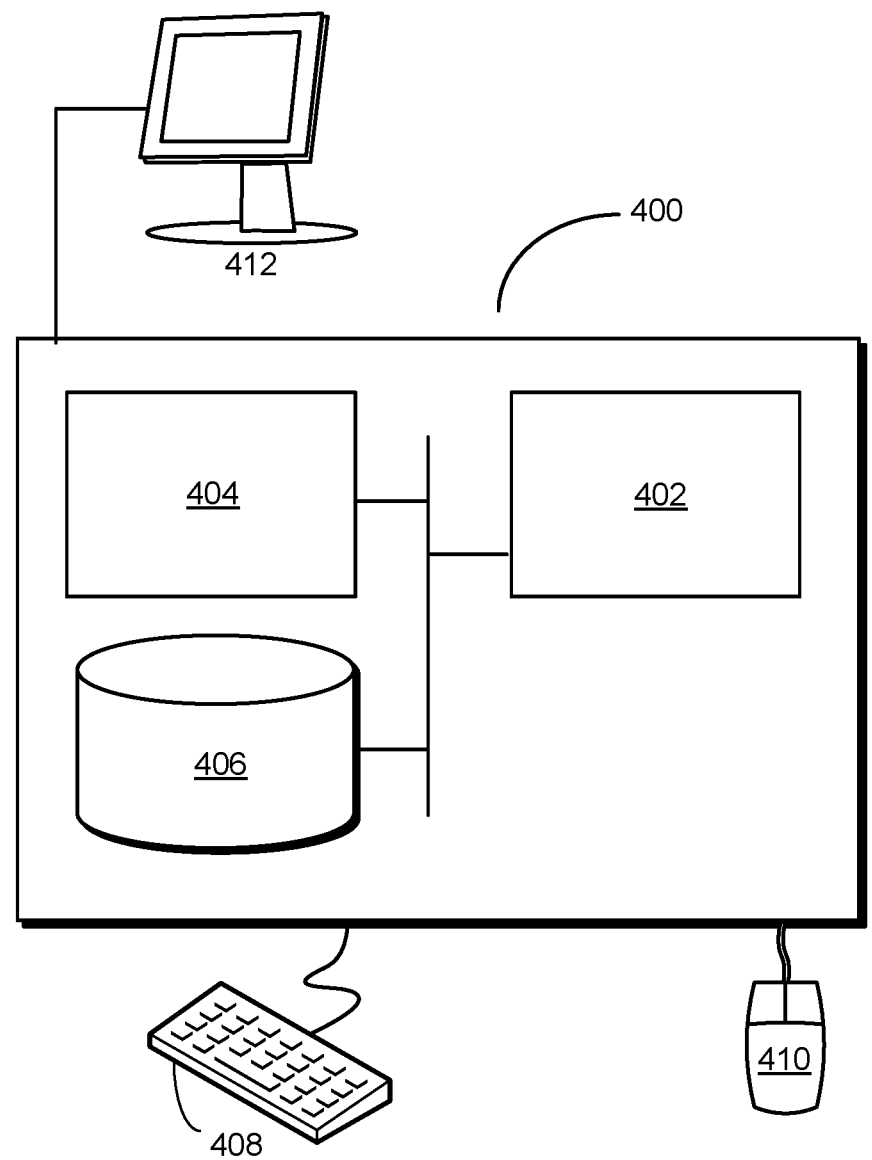
FIG. 4 shows a computer system in accordance with the disclosed embodiments.

FIG. 4 shows a computer system 400 in accordance with the disclosed embodiments. Computer system 400 includes a processor 402, memory 404, storage 406, and/or other components found in electronic computing devices. Processor 402 may support parallel processing and/or multithreaded operation with other processors in computer system 400. Computer system 400 may also include input/output (I/O) devices such as a keyboard 408, a mouse 410, and a display 412.

Computer system 400 may include functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications may obtain the use of hardware resources on computer system 400 from the operating system, as well as interact with the user through a hardware and/or software framework provided by the operating system.

In one or more embodiments, computer system 400 provides a system for performing A/B testing of service-level metrics. The system includes an aggregation apparatus, a testing apparatus, and a management apparatus, one or more of which may alternatively be termed or implemented as a module, mechanism, or other type of system component. The aggregation apparatus obtains service-level metrics for service calls made during an A/B test and/or aggregates the service-level metrics by user identifiers of users in the A/B test. Next, the aggregation apparatus matches the service-level metrics to treatment assignments of the users to a treatment group and a control group in the A/B test. The testing apparatus then applies the A/B test to a first grouping of the service-level metrics for the treatment group and a second grouping of the service-level metrics for the control group. Finally, the management apparatus outputs a result of the A/B test for use in assessing an effect of a treatment variant in the A/B test on the service-level metrics and/or manages subsequent execution of the A/B test based on the result.

In addition, one or more components of computer system 400 may be remotely located and connected to the other components over a network. Portions of the present embodiments (e.g., aggregation apparatus, management apparatus, testing apparatus, data repository, A/B testing platform, online network, etc.) may also be located on different nodes of a distributed system that implements the embodiments. For example, the present embodiments may be implemented using a cloud computing system that performs A/B testing of service-level metrics for a set of remote services.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor (including a dedicated or shared processor core) that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
generating treatment assignments comprising an assignment of users to a treatment group and an assignment of users to a control group;
A/B testing variants by (i) monitoring responses of the users of the treatment group to a treatment variant and (ii) monitoring responses of the users of the control group to a control variant;
while monitoring the responses of the users of the treatment group to the treatment variant, obtaining treatment group service-level metrics generated by at least one computing device involved in providing the treatment variant to the users of the treatment group;
while monitoring the responses of the users of the control group to the control variant, obtaining control group service-level metrics generated by at least one computing device involved in providing the control variant to the users of the control group;
wherein the treatment group service-level metrics are not the responses of the users of the treatment group to the treatment variant and the treatment group service-level metrics are not the responses of the users of the control group to the control variant;
wherein the control group service-level metrics are not the responses of the users of the control group to the control variant and the control group service-level metrics are not the responses of the users of the treatment group to the treatment variant;
aggregating the treatment group service-level metrics by user identifiers of multiple users of the treatment group;
aggregating the control group service-level metrics by user identifiers of multiple users of the control group;
A/B testing aggregated service-level metrics comprising a first grouping of the aggregated treatment group service-level metrics and a second grouping of the aggregated control group service-level metrics for the control group;
determining a treatment effect of the treatment variant on the first grouping of the aggregated treatment group service-level metrics based on the A/B testing of the aggregated service-level metrics;
determining a control effect of the control variant on the second grouping of the aggregated control group service-level metrics based on the A/B testing of the aggregated service-level metrics;
outputting a result that reflects a comparison of the treatment effect to the control effect;
determining whether the result indicates that a performance or an error rate of the at least one computing device involved in providing the treatment variant to the users of the treatment group has degraded; and
in response to determining that the result indicates that a performance or an error rate of the at least one computing device involved in providing the treatment variant to the users of the treatment group has degraded, slowing or stopping the A/B testing of the variants.

2. The method of claim 1, further comprising:
managing subsequent execution of the A/B testing of the variants based on the result.

3. The method of claim 2, wherein managing subsequent execution of the A/B testing of the variants comprises at least one of:
identifying a root cause of a difference between the treatment group service-level metrics and the control group service-level metrics; or
generating output to continue or discontinue the A/B testing of the variants based on the root cause.

4. The method of claim 1, further comprising:
performing additional aggregation of the treatment group service-level metrics by the treatment assignments to produce the first and second groupings of the aggregated treatment group service-level metrics.

5. The method of claim 4, wherein the first and second groupings of the aggregated treatment group service-level metrics comprise:
a first value of a service-level metric that is summed for all users in the treatment group;
a first squared value of the service-level metric that is summed for all users in the treatment group;
a second value of the service-level metric that is summed for all users in the control group; and
a second squared value of the service-level metric that is summed for all users in the control group.

6. The method of claim 5, wherein the first and second groupings of the aggregated treatment group service-level metrics further comprise:
- a first average value of the service-level metric that is obtained by dividing the first value by a first number of users in the treatment group; and
- a second average value of the service-level metric that is obtained by dividing the second value by a second number of users in the control group.

7. The method of claim 4, wherein an additional aggregation of the service-level metrics is performed over a pre-specified period.

8. The method of claim 1, further comprising:
- obtaining tracking events for service calls made during the A/B testing of the variants; and
- aggregating the service-level metrics in the tracking events by the user identifiers in the tracking events.

9. The method of claim 8, further comprising:
- joining, based on the user identifiers, the service-level metrics with a test key for the A/B testing of the variants and the treatment assignments in additional tracking events for the A/B testing of the variants.

10. The method of claim 1, wherein the service-level metrics comprise at least one of:
- a latency;
- an error count;
- a number of inbound requests to a service; or
- a number of outbound requests from the service.

11. The method of claim 10, wherein the latency is at least one of:
- a total latency; or
- an average latency.

12. The method of claim 1, wherein the result of the A/B testing of the aggregated service-level metrics comprises at least one of:
- a difference in the service-level metrics between the treatment group and the control group;
- a confidence interval associated with the difference; or
- a statistical significance of the difference.

13. A system, comprising:
- one or more processors; and
- memory storing instructions that, when executed by the one or more processors, cause the system to:
  - generate treatment assignments comprising an assignment of users to a treatment group and an assignment of users to a control group;
  - A/B test variants by (i) monitoring responses of the users of the treatment group to a treatment variant and (ii) monitoring responses of the users of the control group to a control variant;
  - while monitoring the responses of the users of the treatment group to the treatment variant, obtain treatment group service-level metrics generated by at least one computing device involved in providing the treatment variant to the users of the treatment group;
  - while monitoring the responses of the users of the control group to the control variant, obtain control group service-level metrics generated by at least one computing device involved in providing the control variant to the users of the control group;
  - wherein the treatment group service-level metrics are not the responses of the users of the treatment group to the treatment variant and the treatment group service-level metrics are not the responses of the users of the control group to the control variant;
  - wherein the control group service-level metrics are not the responses of the users of the control group to the control variant and the control group service-level metrics are not the responses of the users of the treatment group to the treatment variant;
  - aggregate the treatment group service-level metrics by user identifiers of multiple users of the treatment group;
  - aggregate the control group service-level metrics by user identifiers of multiple users of the control group;
  - A/B test aggregated service-level metrics comprising a first grouping of the aggregated treatment group service-level metrics and a second grouping of the aggregated control group service-level metrics for the control group;
  - determine a treatment effect of the treatment variant on the first grouping of the aggregated treatment group service-level metrics based on theA/B testing of the aggregated service-level metrics;
  - determine a control effect of the control variant on the second grouping of the aggregated control group service-level metrics based on the A/B testing of the aggregated service-level metrics;
  - output a result that reflects a comparison of the treatment effect to the control effect;
  - determine whether the result indicates that a performance or an error rate of the at least one computing device involved in providing the treatment variant to the users of the treatment group has degraded; and
  - in response to determining that the result indicates that a performance or an error rate of the at least one computing device involved in providing the treatment variant to the users of the treatment group has degraded, slow or stop the A/B testing of the variants.

14. The system of claim 13, wherein the memory further stores instructions that, when executed by the one or more processors, cause the system to:
- manage subsequent execution of the A/B testing of the variants based on the result.

15. The system of claim 13, wherein the memory further stores instructions that, when executed by the one or more processors, cause the system to:
- perform additional aggregation of the service-level metrics by the treatment assignments to produce the first and second groupings of the aggregated service-level metrics.

16. The system of claim 15, wherein the first and second groupings of the aggregated service-level metrics comprise:
- a first value of a service-level metric that is summed for all users in the treatment group;
- a first squared value of the service-level metric that is summed for all users in the treatment group;
- a first average value of the service-level metric that is obtained by dividing the first value by a first number of users in the treatment group;
- a second value of the service-level metric that is summed for all users in the control group;
- a second squared value of the service-level metric that is summed for all users in the control group; and
- a second average value of the service-level metric that is obtained by dividing the second value by a second number of users in the control group.

17. The system of claim 13, wherein the memory further stores instructions that, when executed by the one or more processors, cause the system to:
- obtain tracking events for service calls made during the A/B testing of the variants; and
- aggregate the service-level metrics in the tracking events by the user identifiers in the tracking events.

18. The system of claim 13, wherein the memory further stores instructions that, when executed by the one or more processors, cause the system to:
  join, based on the user identifiers, the service-level metrics with a test key for the A/B testing of the variants and the treatment assignments in additional tracking events for the A/B testing of the variants.

19. The system of claim 13, wherein the service-level metrics comprise at least one of:
  a latency;
  an error count;
  a number of inbound requests to a service; or
  a number of outbound requests from the service.

20. A non-transitory computer-readable storage medium storing instructions that when executed by a computer cause the computer to perform a method, the method comprising:
  generating treatment assignments comprising an assignment of users to a treatment group and an assignment of users to a control group;
  A/B testing variants by (i) monitoring responses of the users of the treatment group to a treatment variant and (ii) monitoring responses of the users of the control group to a control variant;
  while monitoring the responses of the users of the treatment group to the treatment variant, obtaining treatment group service-level metrics generated by at least one computing device involved in providing the treatment variant to the users of the treatment group;
  while monitoring the responses of the users of the control group to the control variant, obtaining control group service-level metrics generated by at least one computing device involved in providing the control variant to the users of the control group;
  wherein the treatment group service-level metrics are not the responses of the users of the treatment group to the treatment variant and the treatment group service-level metrics are not the responses of the users of the control group to the control variant;
  wherein the control group service-level metrics are not the responses of the users of the control group to the control variant and the control group service-level metrics are not the responses of the users of the treatment group to the treatment variant;
  aggregating the treatment group service-level metrics by user identifiers of multiple users of the treatment group;
  aggregating the control group service-level metrics by user identifiers of multiple users of the control group;
  A/B testing aggregated service-level metrics comprising a first grouping of the aggregated treatment group service-level metrics and a second grouping of the aggregated control group service-level metrics for the control group;
  determining a treatment effect of the treatment variant on the first grouping of the aggregated treatment group service-level metrics based on the A/B testing of the aggregated service-level metrics;
  determining a control effect of the control variant on the second grouping of the aggregated control group service-level metrics based on the A/B testing of the aggregated service-level metrics;
  outputting a result that reflects a comparison of the treatment effect to the control effect;
  determining whether the result indicates that a performance or an error rate of the at least one computing device involved in providing the treatment variant to the users of the treatment group has degraded; and
  in response to determining that the result indicates that a performance or an error rate of the at least one computing device involved in providing the treatment variant to the users of the treatment group has degraded, slowing or stopping the A/B testing of the variants.

* * * * *